(12) United States Patent
Pickens

(10) Patent No.: US 10,036,372 B1
(45) Date of Patent: Jul. 31, 2018

(54) INJECTOR PUMP WITH ROLLER BEARING ASSEMBLY

(71) Applicant: Richard Pickens, Oklahoma City, OK (US)

(72) Inventor: Richard Pickens, Oklahoma City, OK (US)

(*) Notice: Subject to any disclaimer, the term of this patent is extended or adjusted under 35 U.S.C. 154(b) by 325 days.

(21) Appl. No.: 14/734,891

(22) Filed: Jun. 9, 2015

Related U.S. Application Data

(60) Provisional application No. 62/010,016, filed on Jun. 10, 2014.

(51) Int. Cl.
*F04B 9/04* (2006.01)
*F04B 19/22* (2006.01)
*F16C 5/00* (2006.01)
*F01B 9/02* (2006.01)

(52) U.S. Cl.
CPC ............... *F04B 9/047* (2013.01); *F01B 9/026* (2013.01); *F04B 19/22* (2013.01); *F16C 5/00* (2013.01)

(58) Field of Classification Search
CPC ........ F04B 9/04; F04B 9/045047; F04B 19/22; F04B 9/042; F04B 35/01; F01B 9/023; F01B 9/026; F01B 9/04; F16C 5/00; F16C 19/00
USPC .......................................... 74/49, 50, 53, 55
See application file for complete search history.

(56) References Cited

U.S. PATENT DOCUMENTS

2004/0255880 A1* 12/2004 Kim .................... F01B 9/023
123/55.5

* cited by examiner

*Primary Examiner* — Kenneth J Hansen
(74) *Attorney, Agent, or Firm* — Phillips Murrah PC; Martin G. Ozinga

(57) ABSTRACT

A positive displacement injector pump for use in the oil and gas industry includes friction reducing roller bearing and head assemblies. The roller bearing assembly is provided to reduce friction in the operation of one or more fluid delivery injector heads and utilizes a motor driving a crosshead and power hub. The power hub has a hub cam follower roller bearing with at least three peripheral perpendicular mounted rolling bearings. A cross head communicates with the hub cam follower roller bearing and is adapted to reciprocate the head assembly to drive the plunger of the injector pump with a guide rod.

1 Claim, 2 Drawing Sheets

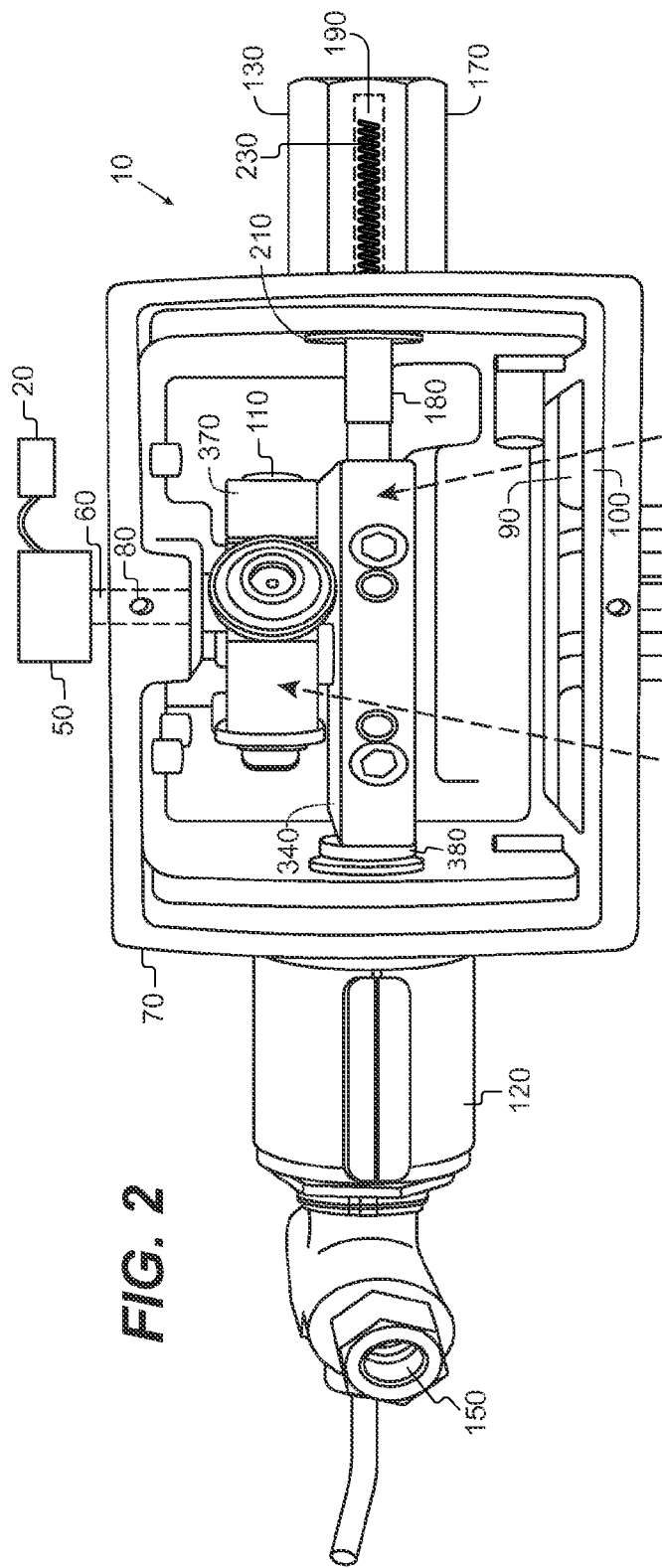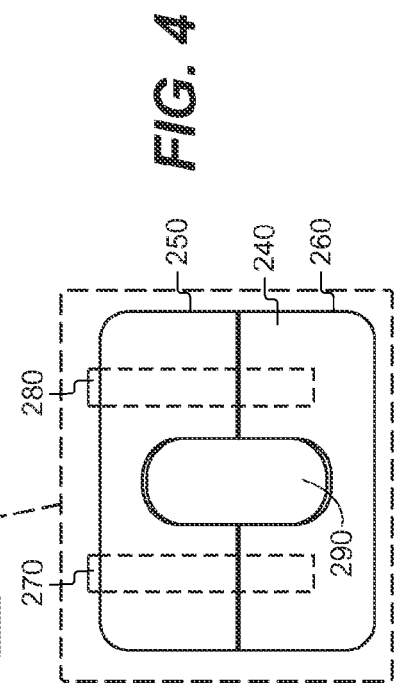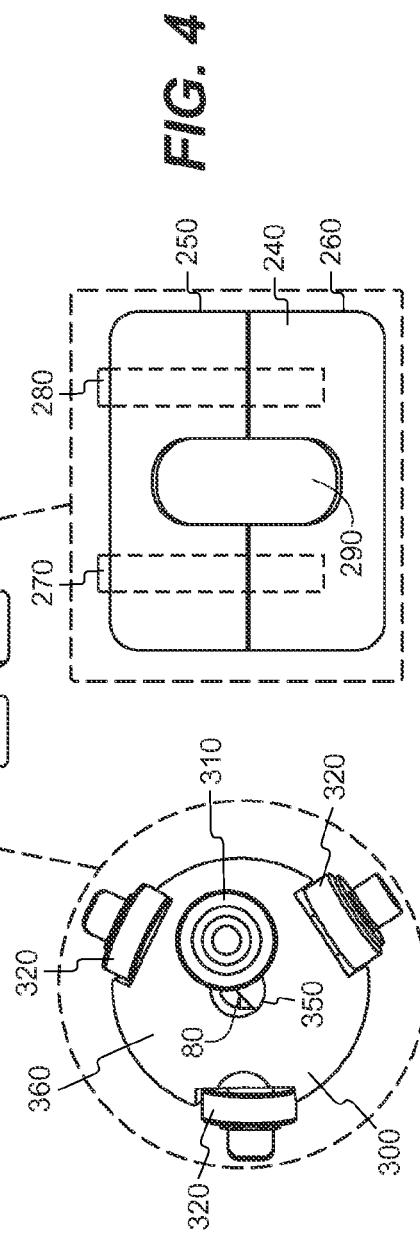

INJECTOR PUMP WITH ROLLER BEARING ASSEMBLY

CROSS-REFERENCE TO RELATED APPLICATIONS

Priority is claimed from provisional application U.S. Ser. No. 62/010,016 filed on Jun. 10, 2014, and incorporated by reference herein.

BACKGROUND OF THE INVENTION

1. Field of the Invention

In general, the present invention relates to injector pumps for use in the oil and gas industry. More particularly, the present invention provides a positive displacement injector pump having a friction reducing roller bearing assembly that may be utilized for pumping and or injecting one or more fluids in a more efficient manner than the prior art.

2. Description of the Prior Art

It is understood that pumps can be generally classified into positive displacement pumps, impulse pumps, velocity pumps, gravity pumps, steam pumps and valveless pumps. A positive displacement pump makes a fluid move by trapping a fixed amount and forcing or displacing that trapped volume into the discharge pipe. Some positive displacement pumps use an expanding cavity on the suction side and a decreasing cavity on the discharge side. Liquid flows into the pump as the cavity on the suction side expands and the liquid flows out of the discharge as the cavity collapses. The volume is constant through each cycle of operation.

Plunger pumps are reciprocating positive displacement pumps. These consist of a cylinder with a reciprocating plunger. The suction and discharge valves are mounted in the head of the cylinder. In the suction stroke, the plunger retracts and the suction valves open causing suction of fluid into the cylinder. In the forward stroke, the plunger pushes the liquid out of the discharge valve. A plunger pump is a type of positive displacement pump where the high-pressure seal is stationary and a smooth cylindrical plunger slides through the seal. This makes them different from piston pumps and allows them to be used at higher pressures. The plunger may be actuated by a steam powered, pneumatic, hydraulic, or electric drive.

Typically, a plunger pump uses a crank mechanism to create a reciprocating motion along an axis, which then builds pressure in a cylinder or working barrel to force gas or fluid through the pump. The pressure in the chamber actuates the valves at both the suction and discharge points. The volume of the fluid discharged is equal to the area of the plunger or piston, multiplied by its stroke length. The overall capacity of the plunger pump can be calculated with the area of the piston or plunger, the stroke length, the number of pistons or plungers and the speed of the drive. The power needed from the drive is proportional to the pressure and capacity of the pump.

Frequently, it is desirable in pumping operations to introduce or inject one or more chemical additives into the fluid being pumped. Such additives may, for example, comprise a viscosity enhancer useful for improving the pumping efficiency. Other additives may, for example, reduce foaming of the fluid being pumped. Frequently, the use of such chemical additives is important to maintain the regular operation of a producing well, and to reduce costly downtime. Many of these chemical additives are quite expensive, and considerable cost savings can be realized if overuse of the chemicals is eliminated. Injection pumps may be designed for the introduction of demulsifiers, corrosion inhibitors, de-scaling agents, solvents and oxygen scavengers. The pumps may also be utilized in association with water treatment, methanol injection in gas pipelines, injection of surfactant or soap into low-pressure gas wells with high water content, and so forth.

Injection pumps obviously require a power source. These power sources are often electrically driven motors where the efficiency of the pump determines the power needed as well as the size of the motor, life span of a motor, and so forth. It is therefore desirable to provide an efficient pump that loses as little power as possible to friction of the moving parts required to perform the pumping action while also providing a durable pump.

The above discussed prior art is not exhaustive. As advances have been made in the oil and gas industry, the need has increased for new and improved injection pumps. Accordingly, a need exists. The current invention provides an inexpensive, time saving, more reliable apparatus and method of using the same where the prior art fails and or is deficient.

SUMMARY OF THE INVENTION

In view of the foregoing disadvantages inherent in the known types of injector pumps and pumps in general use now present in the prior art, the present invention provides a new and improved device and method of use, which may provide dual action pumping generally utilizing a roller bearing assembly that reduces friction and increases pump efficiency over other pumps known in the art. As such, the general purpose of the present invention, which will be described subsequently in greater detail, is to provide a new and improved injector pump and method of using the same, which has all the advantages of the prior art devices and none of the disadvantages.

To attain this, the present invention essentially comprises an injector pump with one or two injector heads driven by a rolling bearing assembly that reduces friction over the prior art drive assemblies. It is understood that the fluid to be pumped may be from one source or more and may be one or more varieties. It is contemplated to provide a gearbox housing with a view port generally positioning a cross head bearing with a roller bearing assembly in communication with a knuckle to actuate one or more pump pistons to deliver fluid.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved injector pump with a roller bearing assembly, which may be easily and efficiently manufactured and marketed.

It is a further object of the present invention to provide a new and improved injector pump with a roller bearing assembly and method of using the same, which is of a durable and reliable construction and may be utilized in numerous applications.

An even further object of the present invention is to provide a new and improved injector pump with a roller bearing assembly and method of using the same, which is susceptible to a low cost of manufacture with regard to both materials and labor, and which accordingly is then susceptible to low prices of sale to the consuming industry, thereby making such tool economically available to those in the field.

Still another object of the present invention is to provide a new and improved injector pump with a roller bearing assembly and method of using the same, which provides all of the advantages of the prior art, while simultaneously overcoming some of the disadvantages normally associated therewith.

Another object of the present invention is to provide a new and improved injector pump with a roller bearing assembly and method of using the same that generally reduces friction in the pumping action thereby allowing for greater efficiency and lower operating costs. Yet another object of the present invention is to provide a new and improved injector pump with a roller bearing assembly and method of using the same that may utilize one drive shaft to operate two pump functions with a smaller foot print than the prior art devices while also needing less power than the prior art devices.

An even further object of the present invention is to provide a new and improved injector pump with a roller bearing assembly and method of using the same that allows for relatively independent injection of more than one type of fluid and or injection to more than one point.

Still another object of the present invention is to provide a new and improved injector pump with a roller bearing assembly and method of using the same that allows for simultaneous injection of one or more sources.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices wherein:

FIG. 2 is a general top view illustration of a preferred embodiment in accordance with the present invention.

FIG. 3 is a general front view illustration of a preferred embodiment in accordance with the present invention generally depicting a power hub with roller bearings.

FIG. 4 is a general front view illustration of a preferred embodiment in accordance with the present invention generally depicting a cross head.

DETAILED DESCRIPTION OF THE PREFERRED EMBODIMENTS

Figure 1:
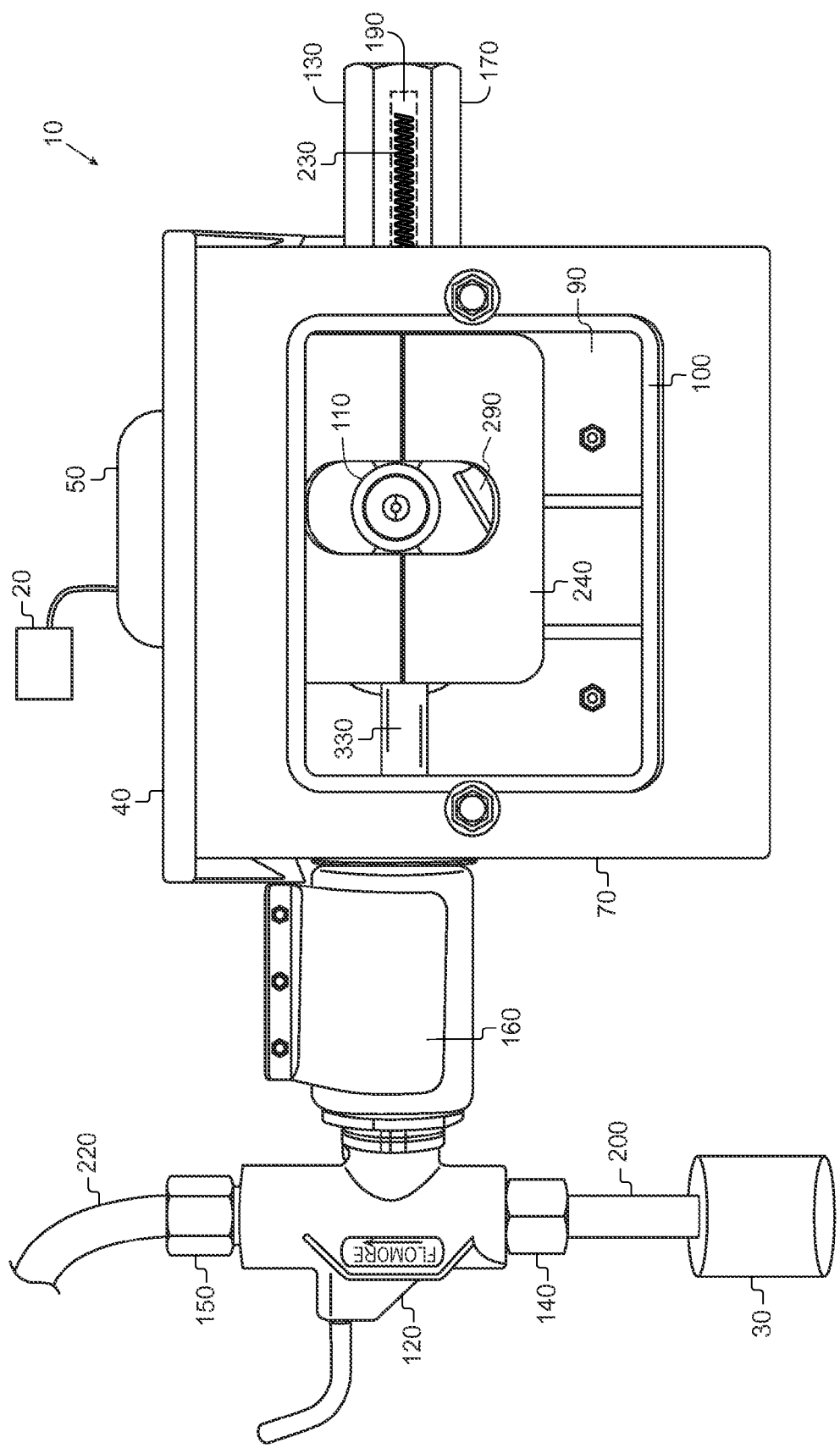
FIG. 1 is a general front view illustration of a preferred embodiment in accordance with the present invention.

Referring to the illustrations, drawings, and pictures, and to FIG. 1 in particular, reference character 10 generally designates a new and improved dual head positive displacement pump system and method of using the same constructed in accordance with the present invention. FIG. 1 generally depicts invention 10 power source 20, fluid source or sources 30, and a removable top cover 40, which will all be discussed in greater detail below.

It is understood that invention 10 may be powered by power source 20 such as but not limited to a computer controlled solar power source and or other hard wired electrical source for powering an electric motor 50 known in the art such as but not limited to a 12 volt electric motor. It is also contemplated that other known types of power sources, powers of motors, and so forth may be utilized. It is also understood that a coupling 60 may be utilized to generally attach motor 50 as is also known in the art. Furthermore, fluid source 30 may be of numerous configurations, types of fluid, and so forth known in the art. Fluid 30 may be utilized for oil and gas applications as well as other applications where it is desired to pump fluids. It is also understood that more than one type of fluid may be pumped for different applications at the same time.

Again referring to the illustrations and more in particular to FIG. 2, the present invention 10 may include a gear box and or housing 70 with removable top cover 40 and a drive shaft 80 through said housing 70. Housing 70 may have a view port 90 that may include a removable see-through cover 100 such as but not limited to clear plastic, glass, combinations thereof and so forth. It is also understood that cover 100 may be integrated into housing 70 and generally not be removable. It is also contemplated that housing 70 may have a top side, a bottom side, a first side with an aperture, a second side with an aperture, a front side with an aperture, and a back side with an aperture as generally depicted and described in greater detail below.

Shaft 80 generally enters housing 70 for positioning roller bearing assembly 110. Housing 70 may generally positionally and rotationally hold roller bearing assembly 110, which will be discussed, in greater detail below.

Housing 70 may further include a first head assembly 120 and a possible second head assembly (not shown) at opening 130. It is understood that first head assembly 120 and a second head assembly may be of a construction known in the art.

First head assembly 120 may include a first suction port 140, a first discharge port 150, and a first plunger assembly and or plunger 160 driven by drive shaft 80. Invention 10 contemplates a second head assembly (not depicted), located at opening 130 may include a second suction port, a second discharge port, and a second plunger assembly driven by the same drive shaft 80. It is understood that other head assemblies may be utilized and that the current invention should not be considered limited to one and or two. It is also understood that first plunger assembly 160 and second plunger assembly (not shown) may be of a configuration known in the art and be adjustable as desired, and may include an eccentric cam, stroke adjuster, and so forth.

First suction port 140 and second suction port (not shown) may be coupled to fluid source 30 by conduit 200 and conduit respectively. It is understood that fluid source 30 may be the same for both, different, and combinations thereof. First discharge port 150 and a second discharge port (not shown) may be coupled by conduit 220 and other conduits respectively to deliver and or inject fluid from fluid source 30 as desired.

Invention 10 contemplates not using a second head assembly and generally capping opening 130 with cap 170. It is understood that first guide rod 180 having a first end and second end would still be utilized for generally positioning cross head 240 as further explained below. Cap 170 may generally have an interior 190 for allowing first guide rod 180 the ability to reciprocate through housing 70 aperture 210 and may include spring 230.

Roller bearing assembly 110 may generally include cross head 240 which may comprise top half 250 and bottom half 260 and held together by a first guide pin 270 and a second guide pin 280. Invention 10 roller bearing assembly 110 further contemplates cross head 240 generally has an aperture and or opening 290 for communicating with power hub 300 hub cam follower 310 wherein hub cam follower 310 may be but is not limited to a roller bearing with an axis. Power hub 300 may further include peripheral bearings 320 such as but not limited to roller bearings with respective axis. It is contemplated that drive shaft 80 essentially turns power hub 300 wherein hub cam follower 310 rotates inside aperture 290 of cross head 240 thereby moving cross head 240 generally in a side to side motion thereby actuating first head assembly 120 by pushing first guide rod 180 through aperture 210 and second guide rod 330 having a first end and second end through aperture 380, respectively and left and right in a reciprocating motion.

Peripheral bearings 320 essentially contact first side 340 of cross head 240 thereby supporting cross head 240 with reduced friction between the two moving pieces. It is understood that more or less peripheral bearings 320 are contemplated such as but not limited to four and are generally positioned on the periphery of Power hub 300. Power hub 300 is adapted to communicate with drive shaft 80 and may have aperture 350 for securing to drive shaft 80 and a first side 360 for locating hub cam follower 310 and a second side 370 for engaging drive shaft 80.

It is therefore contemplated that invention 10 may be an injector pump comprising: a housing having a top side, a bottom side, a first side with an aperture, a second side with an aperture, a front side with an aperture, and a back side with an aperture; a power hub having a first side, a second side, a periphery, an aperture between said first side and said second side, hub cam follower roller bearing having an axis mounted on said first side wherein said roller bearing axis is mounted perpendicular to said first side, at least three peripheral rolling bearings each having an axis mounted perpendicular to said aperture between first side and said second side; a drive shaft in communication with said power hub for rotating said power hub; a cross head adapted to communicate with hub cam follower roller bearing for pushing said cross head side to side in a reciprocating motion; a guide pin adapted to move side to side in a reciprocating motion and having a first end and a second end wherein said guide pin second end is in communications with said cross head; and a head assembly comprising a suction port, a discharge port, and a plunger wherein said plunger is driven by said guide pin second end for moving fluids from said suction port to said discharge port.

Changes may be made in the combinations, operations, and arrangements of the various parts and elements described herein without departing from the spirit and scope of the invention.

I claim:

1. An injector pump comprising:
   a housing having a top side, a bottom side, a first side with a first aperture, a second side with a second aperture, a front side with a third aperture, and a back side with a fourth aperture;
   a power hub having a first power hub side, a second power hub side, a periphery, a power hub aperture between said first power hub side and said second power hub side, a hub cam follower roller bearing having an axis and a bearing end and a mounting end with said mounting end mounted on said first power hub side wherein said hub cam follower roller bearing is mounted perpendicular to said first power hub side, at least three peripheral rolling bearings each being mounted perpendicular to said power hub aperture between said first power hub side and said second power hub side;
   a drive shaft in communication with said power hub for rotating said power hub;
   a cross head adapted to communicate with said hub cam follower roller bearing for pushing said cross head side to side in a reciprocating motion;
   a guide rod adapted to move side to side in a reciprocating motion and having a first end and a second end wherein said guide rod second end is in communications with said cross head; and
   a head assembly comprising a suction port, a discharge port, and a plunger wherein said plunger is driven by said guide rod first end for moving fluids from said suction port to said discharge port.

* * * * *